(12) United States Patent
Götz et al.

(10) Patent No.: US 8,614,867 B2
(45) Date of Patent: Dec. 24, 2013

(54) POWER SUPPLY FOR AN ELECTRONIC TRIPPING UNIT FOR A SWITCH, IN PARTICULAR A CIRCUIT BREAKER FOR LOW VOLTAGES, AND A SWITCH HAVING A POWER SUPPLY SUCH AS THIS

(75) Inventors: Josef Götz, Freudenberg-Aschach (DE); Thomas Kiendl, Wernberg-Köblitz (DE)

(73) Assignee: Siemens Aktiengesellschaft, Munich (DE)

( * ) Notice: Subject to any disclaimer, the term of this patent is extended or adjusted under 35 U.S.C. 154(b) by 74 days.

(21) Appl. No.: 13/217,377

(22) Filed: Aug. 25, 2011

(65) Prior Publication Data

US 2012/0050934 A1 Mar. 1, 2012

(30) Foreign Application Priority Data

Aug. 26, 2010 (DE) .................. 10 2010 036 078

(51) Int. Cl.
*H02H 9/08* (2006.01)

(52) U.S. Cl.
USPC ............................................. 361/42; 361/44

(58) Field of Classification Search
USPC ................................................. 361/42–50
See application file for complete search history.

(56) References Cited

U.S. PATENT DOCUMENTS

| | | | |
|---|---|---|---|
| 6,833,713 B2 * | 12/2004 | Schoepf et al. | 324/536 |
| 7,292,419 B1 * | 11/2007 | Nemir | 361/42 |
| 2006/0119344 A1 | 6/2006 | Benke | |
| 2011/0038092 A1 | 2/2011 | Meid | |

FOREIGN PATENT DOCUMENTS

| | | |
|---|---|---|
| DE | 10 2006 037 230 A1 | 2/2008 |
| DE | 10 2007 045 634 B3 | 5/2009 |
| DE | 10 2008 049 566 A1 | 4/2010 |
| EP | 0 043 020 A1 | 1/1982 |

OTHER PUBLICATIONS

Certified German Priority document for German Application No. 10 2010 036 078.3 filed Aug. 26, 2010 (Not Yet Published).

* cited by examiner

*Primary Examiner* — Danny Nguyen

(74) *Attorney, Agent, or Firm* — Harness, Dickey & Pierce, P.L.C.

(57) ABSTRACT

A power supply is disclosed for an electronic tripping unit and, in particular a circuit breaker for low voltages, which is connected on the outgoer side to a load via whose load resistance a direct current or alternating current flows. An electronic tripping unit initiates the disconnection of the associated contact elements in the event of an overcurrent and/or short-circuit current, and a voltage tap taps off a voltage on the conductor in order to supply power to the tripping unit. In order to ensure that power is always supplied to the tripping unit, the power supply includes, in at least one embodiment, an inductance between the load and the voltage tap, which inductance is connected in the conductor and is of such a magnitude that, when the current changes over time during the course of a short circuit, the voltage which is tapped off as the voltage drop across the inductance ensures the supply of electrical power to the tripping unit at least for a minimum time.

8 Claims, 2 Drawing Sheets

POWER SUPPLY FOR AN ELECTRONIC TRIPPING UNIT FOR A SWITCH, IN PARTICULAR A CIRCUIT BREAKER FOR LOW VOLTAGES, AND A SWITCH HAVING A POWER SUPPLY SUCH AS THIS

PRIORITY STATEMENT

The present application hereby claims priority under 35 U.S.C. §119 on German patent application number DE 10 2010 036 078.3 filed Aug. 26, 2010, the entire contents of which are hereby incorporated herein by reference.

FIELD

At least one embodiment of the invention generally relates to a power supply for an electronic tripping unit for a switch, in particular a circuit breaker for low voltages, and/or to a switch having a power supply such as this.

BACKGROUND

Circuit breakers, in particular for low voltages, are known and are also used for direct-current operation, and are connected on the outgoer side to at least one load. Below the rated current of the switch, a direct current or alternating current which corresponds to the load flows via the load resistance through a conductor which runs through the switch. When the switch is closed, contact elements rest on one another, and are disconnected from one another in order to open the switch. An electronic tripping unit initiates the disconnection of the contact elements when a predetermined current limit value is exceeded; this is the case when an overcurrent and a short-circuit current occur. In order to supply power to the tripping unit, a voltage is tapped off on the conductor, which voltage is dropped across the load resistance when the switch is closed, and across the switching contacts when the switch is open. Therefore, when the switch is closed, the voltage tap is in each case dependent on the presence of a load which is not excessively low.

When a short circuit occurs, the load and therefore the voltage drop across the load resistance become so small, however, that the power supply to the tripping unit is no longer ensured.

SUMMARY

The inventors discovered that this has the disadvantage that a second power supply for the tripping unit must be provided in each case, in addition to the voltage tap, for the short-circuit situation.

In at least one embodiment of the invention, it is ensured that the tripping unit is supplied with power during direct-current operation or alternating-current operation, even in the event of a short circuit.

With respect to the power supply, at least one embodiment of the solution provides for an inductance to be connected in the conductor between the load and the voltage tap, and to be of such a magnitude that, when the current changes over time during the course of a short circuit, the voltage which is tapped off as the voltage drop across the inductance ensures the supply of electrical power to the tripping unit for a predetermined minimum time.

With respect to the switch, at least one embodiment of the solution provides that the power supply has an inductance between the load and the voltage tap, which inductance is connected in the conductor and is of such a magnitude that, when the current changes over time during the course of a short circuit, the voltage which is tapped off as the voltage drop across the inductance ensures the supply of electrical power to the tripping unit for a predetermined minimum time.

BRIEF DESCRIPTION OF THE DRAWINGS

The invention will be described in more detail in the following text with reference to the drawings, in which.

DETAILED DESCRIPTION OF THE EXAMPLE EMBODIMENTS

Figure 1:
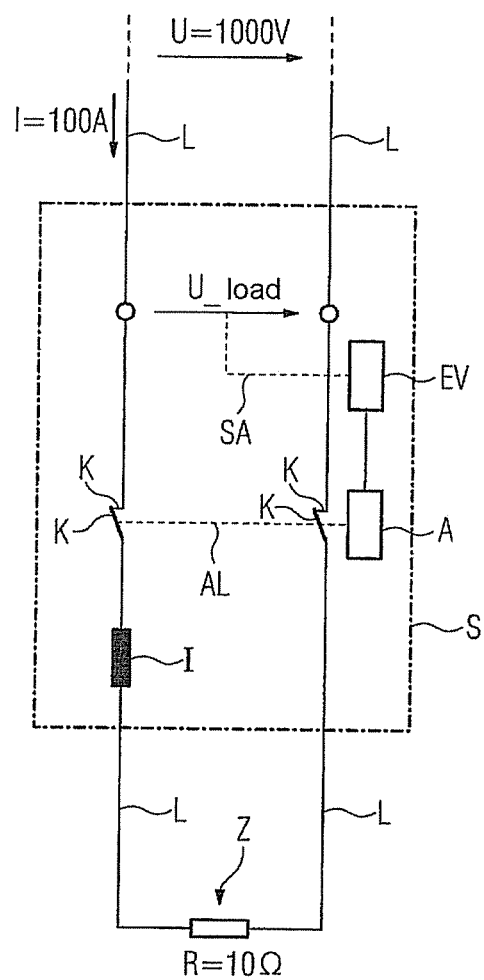
FIG. 1 shows an electrical circuit having a load which is connected to a DC voltage via a switch.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a load Z having a load resistance R which is connected via electrical conductors L to a DC voltage U (low voltage) of 1000 V. In this case, the DC voltage U produces a direct current I of 100 A through the load resistance R. A switch S, in this case a circuit breaker for low voltages, is arranged between the conductors L and the load resistance R, and is connected on the outgoer side to the load resistance R. As illustrated, the conductors L run through the switch S.

The switch S comprises an electronic tripping unit A, which initiates the opening of the switch S (dashed line AL) when a current limit value is exceeded, particularly in the event of an overcurrent and/or short-circuit current, the contact elements K of which switch S rest on one another when the switch S is closed, and are disconnected from one another for opening.

A voltage tap SA (dashed line) taps off a voltage U_load on the conductor L, which voltage U_load corresponds to the voltage drop across the load resistance R and supplies the tripping unit A with current (power supply EV), thus ensuring that it is supplied with electrical power.

Figure 2:
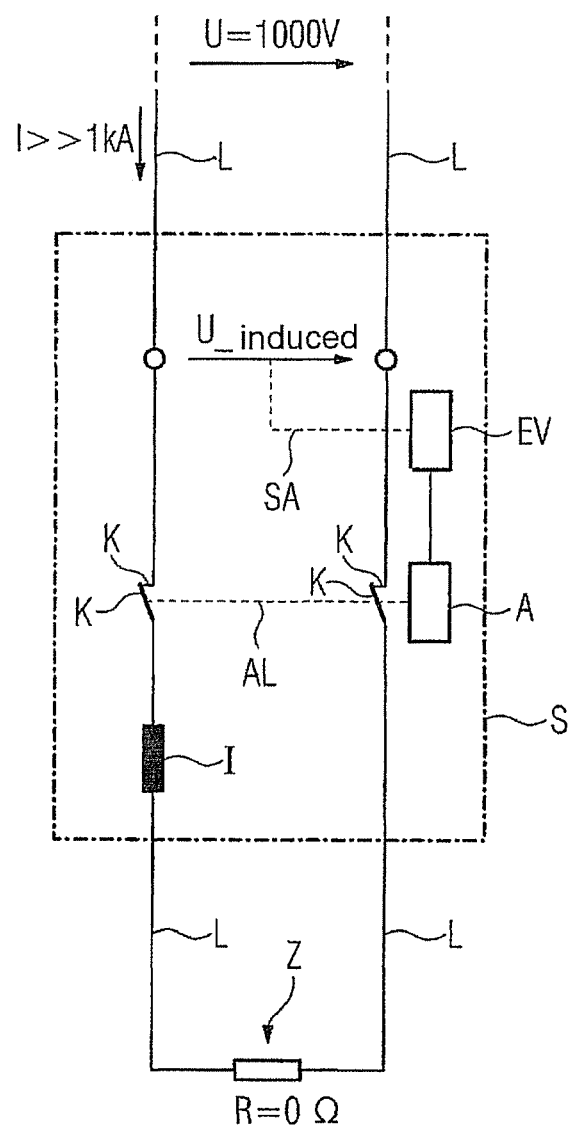
FIG. 2 shows the circuit as shown in FIG. 1 in the event of a short circuit.

This power supply operates until a short circuit occurs, since the load resistance R then becomes very small or tends to zero as is illustrated in FIG. 2.

An inductance I is therefore connected in the conductor L between the load resistance R (load Z) and the voltage tap SA, which inductance I is of such a magnitude that the current which varies over time during the course of a short circuit produces a voltage drop U_induced across the inductance I, such that the tapped-off voltage (voltage tap SA) ensures that the tripping unit A is supplied with electrical power for a predetermined minimum time in the event of a short circuit.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A power supply for an electronic tripping unit for a switch, connected on an outgoer side to a load via whose load resistance a direct current flows, a conductor running through the switch, with contact elements resting on one another when the switch is closed and being disconnected from one another in order to open the switch, the electronic tripping unit initiating the disconnection of the contact elements when a current limit value is exceeded, a voltage tap being included to tap off a voltage on the conductor, the voltage ensuring supply of electrical power to the tripping unit, the power supply comprising:

an inductance connected in series with the load, the inductance being of such a magnitude that, when the direct current changes over time during the course of a short circuit, the voltage on the conductor which is tapped off as the voltage drops across the inductance and the load ensures the supply of electrical power to the tripping unit for a minimum time.

2. A switch, connected on an outgoer side to a load via whose load resistance, a direct current flows, the switch comprising:

a conductor which runs through the switch;

contact elements which rest on one another when the switch is closed and which are disconnected from one another in order to open the switch;

an electronic tripping unit to initiate the disconnection of the contact elements when a limit current value is exceeded;

a voltage tap to tap off a voltage on the conductor to supply power to the tripping unit; and an inductance connected in series with the load, the inductance being of such a magnitude that when the direct current changes over time during the course of a short circuit, the voltage on the conductor which is tapped off as the voltage drops across the inductance and the load ensures the supply of electrical power to the tripping unit at least for a minimum time.

3. The power supply of claim 1, wherein the power supply is for an electronic tripping unit for a circuit breaker for low voltages.

4. The power supply of claim 1, wherein the electronic tripping unit initiates the disconnection of the contact elements when a limit current value is exceeded, in the event of at least one of an overcurrent and short-circuit current.

5. The switch of claim 2, wherein the switch is a circuit breaker for low voltages.

6. The switch of claim 2, wherein the electronic tripping unit initiates the disconnection of the contact elements when a limit current value is exceeded, in the event of at least one of an overcurrent and short-circuit current.

7. The power supply of claim 1, wherein the inductance is between a first one of the contact elements and the load.

8. The switch of claim 2, wherein the inductance is between a first one of the contact elements and the load.

\* \* \* \* \*